Patented Aug. 29, 1933

1,924,698

UNITED STATES PATENT OFFICE 1,924,698

ALKYLATED ACIDYL POLYALKYLENE POLYAMINES

Wilhelm Neelmeier, Theodor Nocken, and Hermann Friedrich, Leverkusen-on-the-Rhine, Germany, assignors, by mesne assignments, to General Aniline Works, Inc., New York, N. Y.

No Drawing. Application May 27, 1930, Serial No. 456,281, and in Germany June 5, 1929

10 Claims. (Cl. 260—124)

The present invention relates to a process of alkylating condensation products from higher aliphatic fatty acids and polyalkylene polyamines and to the new products of preparing same.

In our copending application of even date entitled "Acidyl polyalkylene polyamines" there is described the manufacture of preparing condensation products which may be represented by the probable general formula:

Y—CO—NH—A—Z wherein A represents the group

—CHR—CHR$_1$—NH— of which there are two or more serially arranged, R and R$_1$ standing for hydrogen or methyl, wherein "Y" stands for an aliphatic hydrocarbon radical preferably such a one as contains at least 9 carbon atoms, which hydrocarbon radical may contain one or more double bonds and which may be substituted by hydroxy groups, that is the grouping "Y—CO—" stands for the acidyl radical of a saturated or unsaturated fatty acid, for example, for the radical of lauric acid, palmitic acid, stearic acid, oleic acid, ricinoleic acid, wool fat fatty acids, and Z stands for hydrogen or an aliphatic acidyl radical derived from a saturated or unsaturated fatty acid preferably one containing at least 10 carbons atoms which may be substituted by hydroxy groups.

The preferred condensation products may be represented by the formula:

Y—CO—NH—CHR—CHR$_1$—NH—
    CHR—CHR$_1$—NH—Z wherein Y, R and R$_1$ are defined as above and Z stands for hydrogen, an aliphatic acidyl, —CHR—CHR$_1$—NH$_2$ or —CHR—CHR$_1$—NH— aliphatic acidyl in which the R's are defined as above and the aliphatic acidyl is derived from a saturated or unsaturated fatty acid which may be substituted by hydroxy groups, preferably such an acid as contains at least 10 carbon atoms.

These condensation products are obtainable in the usual manner for instance, by causing to react together a polyalkylene polyamine which may be represented by the general formula:

H$_2$N—A—H wherein A is defined as above, and a higher aliphatic saturated fatty acid, preferably a monobasic fatty acid containing at least 10 carbon atoms, or an ester of such fatty acid, for example, the ethyl esters or advantageously the glycerides as occurring in nature, at a temperature between about 130 and 250° C.

According to the process of said copending application there is obtained a mixture of monoacidyl polyalkylene polyamines and diacidyl polyalkylene polyamines; further there is stated that the monoacidyl products are soluble in dilute hydrochloric acid, acetic acid, alcohol, fat, insoluble or sparingly soluble in water and insoluble in alkalines and the diacidyl compounds are insoluble in dilute hydrochloric acid, alkalies and water and soluble in hot alcohol.

Now we have found that the monoacidyl compounds or the mixtures of mono- and di-acidyl compounds can be transformed into water soluble products by treating the same in the usual manner with an alkylating agent, especially such a one which introduces alkyl groups containing one to three carbon atoms, for example, alkylene oxides, dialkyl sulfates, halogen alkyls; if desired, the alkylation can be performed in an inert organic solvent, such as benzene and toluene. The alkylation is completed when a sample taken from the reaction mixture is clearly soluble in water.

Our new products may be represented by the probable general formula:

Y—CO—NH—A—CHR—CHR$_1$—X wherein A represents the group —CHR—CHR$_1$—NH— or more than one of such groups serially arranged, wherein "R" and "R$_1$" stand for hydrogen or methyl, "Y" stands for an aliphatic hydrocarbon radical, preferably such a one as contains at least 9 carbon atoms, which hydrocarbon radical may contain one or more double bonds and which may be substituted by hydroxy groups, and in which X stands for one of the groups

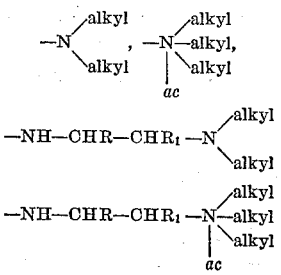

wherein the alkyl may be substituted by hydroxyl and "ac" stands for a monovalent acidyl radical, for example Cl, $SO_4H$, $SO_4$ alkyl.

A preferred method of carrying out our process consists in alkylating the mixture of mono- and di-acidyl polyalkylene polyamines until the mass has become soluble in water; applicants cannot say whether or not alkyl groups enter the imino groups of the condensation products, but if so, these alkylation products are to be considered as a part of the invention and as being included within the scope of the claims.

Our new products are oily or solid substances, readily soluble in water and in contradistinction to the starting materials are not precipitated by dilute alkalies. Wetting and emulsifying agents are thus obtained, which are applicable equally well in acid, neutral or alkaline solution.

The invention is illustrated by the following examples, without being limited thereto:

*Example 1.*—100 parts by weight of the condensation product from oleic acid and triethylene-tetramine are mixed in a vessel which can be closed with 50 parts by weight of ethylene oxide and left to stand for some hours. It is then heated to about 80° C. and the excess ethylene oxide removed. The reaction product is readily soluble in water as well as in acidified water or alkaline water.

*Example 2.*—300 parts by weight of the condensation product from oleic acid and a mixture of polyalkylene polyamines and piperazines (obtainable by the action of ammonia on ethylene chloride at 80–120° C. under a pressure of 10 atm., and the subsequent distilling off of the ethylene diamine) are dissolved in 1000 parts by weight of toluene and 350 parts by weight of dimethyl sulfate are caused to run in with stirring. After completion of the decomposition the toluene is distilled off, ultimately under reduced pressure. A brown mass remains behind, which is readily soluble in water, dilute acids and alkalies.

*Example 3.*—369 parts by weight of mono-stearyl-triethylene-tetramine and 1800 parts by weight of ethylenebromide are heated to boiling under reflux condenser, until a test position freed from excess ethylenebromide is smoothly water soluble. After distilling off the ethylenebromide there remains a brownish colored mass which exhibits great foam forming properties in aqueous solutions. By the addition of sodium carbonate until alkaline reaction, this solution is not precipitated on cooling.

*Example 4.*—Equal parts by weight of propylen-oxide and the condensation product of linseed oil and a mixture of oleic acid ethylester with triethylenetetramine are heated for several hours to 80° C., the excess propyleneoxide being distilled off. A light yellow oil remains which is easily soluble in alcohol. When dissolving this oil in dilute aqueous hydrochloric acid and adding sodium carbonate until the solution is strongly alkaline reaction, no precipitation takes place on cooling.

The expressions employed in the claims, such as "from a higher aliphatic fatty acid and a polyalkylene polyamine" are used to conveniently designate the source of the parent material which has been alkylated and are not to be regarded as a limitation of the product when and as obtained from parent materials which are produced by the reaction of a higher fatty acid upon a polyalkylene polyamine. The scope of the claims is to be determined by reference to the formulæ employed and the definitions of the variables therein.

We claim:

1. Alkylated condensation products from a higher fatty acid and a polyalkylene polyamine of the probable general formula:

$$Y—CO—NH—CHR—CHR_1—NH—CHR—CHR_1—X$$

wherein R and $R_1$ stand for hydrogen or methyl, Y stands for an aliphatic hydrocarbon radical containing at least 9 carbon atoms which may contain double bonds and which may be substituted by hydroxyl, X stands for one of the groups

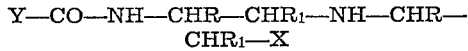

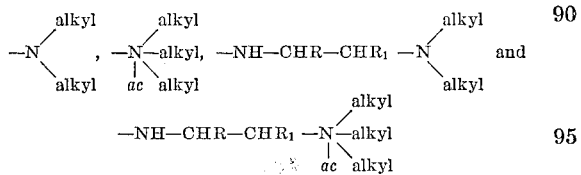

wherein the alkyl may be substituted by hydroxyl, and "ac" stands for a monovalent acidyl radical, said alkylated products being soluble in water and aqueous alkalies and acids and being valuable wetting and emulsifying agents.

2. Alkylated condensation products from a higher fatty acid and a polyalkylene polyamine of the probable general formula:

$$Y—CO—NH—CHR—CHR_1—NH—CHR—CHR_1—X$$

wherein R and $R_1$ stand for hydrogen or methyl, Y stands for an aliphatic hydrocarbon radical containing from 15 to 17 carbon atoms which may contain double bonds and which may be substituted by hydroxyl, X stands for one of the groups

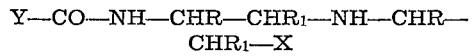

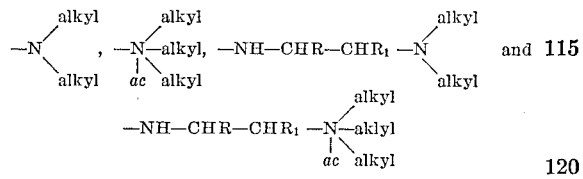

wherein the alkyl may be substituted by hydroxyl, and "ac" stands for a monovalent acidyl radical, said alkylated products being soluble in water and aqueous alkalies and acids and being valuable wetting and emulsifying agents.

3. Alkylated condensation products from a higher fatty acid and a polyalkylene polyamine of the probable general formula:

$$C_{17}H_{33}CO—NH—CH_2—CH_2—NH—CH_2—CH_2—X$$

wherein X stands for one of the groups

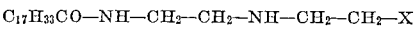

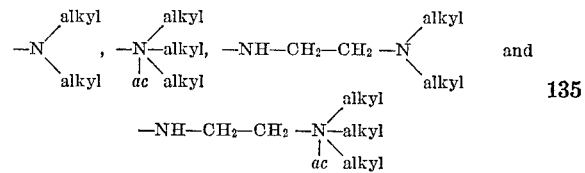

in which the alkyl may be substituted by hydroxyl, and "ac" stands for a monovalent acidyl radical, said alkylated products being soluble in water and aqueous alkalies and acids and being valuable wetting and emulsifying agents.

4. Alkylated condensation products from a higher fatty acid and a polyalkylene polyamine of the probable general formula:

$$Y—CO—NH—CH_2—CH_2—NH—CH_2—CH_2—X$$

wherein Y stands for an aliphatic hydrocarbon radical containing from 15 to 17 carbon atoms which may contain double bonds and which may be substituted by hydroxyl, X stands for one of the groups $$-N\begin{smallmatrix}\text{alkyl}\\\text{alkyl}\end{smallmatrix}, \quad -N\begin{smallmatrix}\text{alkyl}\\ac\text{ alkyl}\end{smallmatrix}, \quad -NH-CH_2-CH_2-N\begin{smallmatrix}\text{alkyl}\\\text{alkyl}\end{smallmatrix} \quad \text{and}$$

$$-NH-CH_2-CH_2-N\begin{smallmatrix}\text{alkyl}\\ac\text{ alkyl}\end{smallmatrix}$$

in which the alkyl groups contain from 1 to 3 carbon atoms, which alkyl groups may be substituted by hydroxyl, and "ac" stands for a monovalent acidyl radical, said alkylated products being soluble in water and aqueous alkalies and acids and being valuable wetting and emulsifying agents.

5. Alkylated condensation products from oleic acid and a polyalkylene polyamine of the probable general formula:

$$C_{17}H_{33}CO-NH-CH_2-CH_2-NH-CH_2-CH_2-X$$

wherein X stands for one of the groups $$-N\begin{smallmatrix}\text{alkyl}\\\text{alkyl}\end{smallmatrix}, \quad -N\begin{smallmatrix}\text{alkyl}\\ac\text{ alkyl}\end{smallmatrix}, \quad -NH-CH_2-CH_2-N\begin{smallmatrix}\text{alkyl}\\\text{alkyl}\end{smallmatrix} \quad \text{and}$$

$$-NH-CH_2-CH_2-N\begin{smallmatrix}\text{alkyl}\\ac\text{ alkyl}\end{smallmatrix}$$

in which the alkyl groups contain from 1 to 3 carbon atoms, which alkyl groups may be substituted by hydroxyl, and "ac" stands for a monovalent acidyl radical, said alkylated products being soluble in water and aqueous alkalies and acids and being valuable wetting and emulsifying agents.

6. Alkylated condensation products from a higher fatty acid and a polyalkylene polyamine of the probable general formula:

$$Y-CO-NH-CH_2-CH_2-NH-CH_2-CH_2-X$$

wherein Y stands for an aliphatic hydrocarbon radical containing from 15 to 17 carbon atoms which may contain double bonds and which may be substituted by hydroxyl, and X stands for $$-N\begin{smallmatrix}CH_3\\CH_3\\SO_4H\end{smallmatrix} \quad \text{or} \quad -NH-CH_2-CH_2-N\begin{smallmatrix}CH_3\\CH_3\\SO_4H\end{smallmatrix}$$

said alkylated products being soluble in water and aqueous alkalies and acids and being valuable wetting and emulsifying agents.

7. Alkylated condensation products from oleic acid and a polyalkylene polyamine of the probable general formula:

$$C_{17}H_{33}-CO-NH-CH_2-CH_2-NH-CH_2-CH_2-X$$

wherein X stands for $$-N\begin{smallmatrix}CH_3\\CH_3\\SO_4H\end{smallmatrix} \quad \text{or} \quad -NH-CH_2-CH_2-N\begin{smallmatrix}CH_3\\CH_3\\SO_4H\end{smallmatrix}$$

said alkylated products being soluble in water and aqueous alkalies and acids and being valuable wetting and emulsifying agents.

8. As new products, the alkylated condensation products from a higher fatty acid and a mixture of polyalkylene polyamines and piperazines, said mixture being obtainable by the action of ammonia on ethylene chloride at 80–120° C. under a pressure of 10 atmospheres and subsequently distilling off the ethylene-diamine, being oily substances soluble in water and aqueous alkali and acids and being valuable wetting and emulsifying agents.

9. As new products, the methylated condensation products from oleic acid and a mixture of polyalkylene polyamines and piperazines, said mixture being obtainable by the action of ammonia on ethylene chloride at 80–120° C. under a pressure of 10 atmospheres and subsequently distilling off the ethylene-diamine, being a brown mass soluble in water and aqueous alkali and acids and being valuable wetting and emulsifying agents.

10. Alkylated condensation products of the higher fatty acids and a polyalkylene polyamine of the probable general formula $$Y-CO-NH-A-CHR-CHR_1-X$$

wherein A represents the group $CHR-CHR_1-NH$ or more than one of such groups serially arranged, R and $R_1$ standing for hydrogen or methyl, wherein Y stand for an aliphatic hydrocarbon radical containing at least 9 carbon atoms which may contain double bonds and which may be substituted by hydroxyl, and X stands for one of the groups $$N\begin{smallmatrix}\text{alk}\\\text{alk}\end{smallmatrix} \quad \text{and} \quad N\begin{smallmatrix}\text{alk}\\\text{alk}\\ac\end{smallmatrix},$$

"alk" meaning alkyl which may be substituted by hydroxyl and "ac" standing for a monovalent acidyl radical, being soluble in water and aqueous alkali and acids, and being valuable wetting and emulsifying agents.

WILHELM NEELMEIER.
THEODOR NOCKEN.
HERMANN FRIEDRICH.